United States Patent
Chen et al.

(10) Patent No.: US 10,187,221 B2
(45) Date of Patent: Jan. 22, 2019

(54) AUTOMATIC SERVER DISPATCHING SYSTEM AND METHOD

(71) Applicant: Climax Technology Co., LTD., Taipei (TW)

(72) Inventors: Yi-Kai Chen, Taipei (TW); Chun Chi Huang, Taipei (TW); Hao-Cheng Lu, Taipei (TW); Pin-Hao Lin, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 394 days.

(21) Appl. No.: 15/059,218

(22) Filed: Mar. 2, 2016

(65) Prior Publication Data

US 2017/0207928 A1    Jul. 20, 2017

(30) Foreign Application Priority Data

Jan. 14, 2016   (TW) .............................. 105101014 A

(51) Int. Cl.
| | |
|---|---|
| *G06F 15/173* | (2006.01) |
| *H04L 12/28* | (2006.01) |
| *H04L 12/24* | (2006.01) |
| *H04L 12/58* | (2006.01) |
| *H04L 29/08* | (2006.01) |

(52) U.S. Cl.
CPC ........ *H04L 12/2809* (2013.01); *H04L 12/283* (2013.01); *H04L 29/08144* (2013.01); *H04L 41/0816* (2013.01); *H04L 41/0886* (2013.01); *H04L 51/046* (2013.01); *H04L 67/1002* (2013.01); *H04L 67/1004* (2013.01); *H04L 67/1008* (2013.01); *H04L 67/1012* (2013.01); *H04L 67/12* (2013.01)

(58) Field of Classification Search
CPC .. H04L 29/08144; H04L 47/00–47/125; H04L 67/10–67/1012; H04L 12/283–12/2836
See application file for complete search history.

(56) References Cited

U.S. PATENT DOCUMENTS

| | | | |
|---|---|---|---|
| 6,779,017 | B1 | 8/2004 | Lamberton et al. |
| 6,928,485 | B1 * | 8/2005 | Krishnamurthy ........................... G06F 17/30598 709/220 |

(Continued)

FOREIGN PATENT DOCUMENTS

WO    WO2008102311 A2    8/2008

OTHER PUBLICATIONS

Ivana Podnar Zarko et al., "Presence@FER: An Ecosystem for Rich Presence", Telecommunications (Contel), Proceedings of the 2011 11th International Conference on, IEEE, Jun. 15, 2011, pp. 133-140. ISBN: 978-1-61284-169-4.

(Continued)

*Primary Examiner* — Brendan Y Higa

(74) *Attorney, Agent, or Firm* — Donald E. Stout; Stout, Uxa & Buyan, LLP

(57) ABSTRACT

The present invention discloses an automatic server dispatching system and method, in which gateways communicate with service servers via a two-way communication server. A dispatching server dispatches the gateways to the service servers according to a dispatching status of the service servers and upper service limits of the service servers.

18 Claims, 9 Drawing Sheets

(56) References Cited

U.S. PATENT DOCUMENTS 7,428,588 B2 * 9/2008 Berstis ................. G06F 9/5061
709/203
2003/0187920 A1 10/2003 Redkar

OTHER PUBLICATIONS

"Digital Cellular Telecommunications System (Phase 2+)"; Universal Mobile Telecommunications System (UMTS); LTE; IP Multimedia Subsystem (IMS); Stage 2 (3GPP TS 23.228 version 10.9.0 Release 10, Technical Specification, European Telecommunications Standards Institute (ETSI), vol. 3GPP SA 2, No. V10.9.0, Jul. 1, 2015.

Extended European Search Report dated May 31, 2016 in related European Application No. 16162343.4.

* cited by examiner

AUTOMATIC SERVER DISPATCHING SYSTEM AND METHOD

CROSS-REFERENCE TO RELATED APPLICATIONS

The entire contents of Taiwan Patent Application No. 105101014, filed on Jan. 14, 2016, from which this application claims priority, are expressly incorporated herein by reference.

BACKGROUND OF THE INVENTION

1. Field of the Invention

The present invention generally relates to a two-way communication system, and more particularly to an automatic server dispatching system and method.

2. Description of Related Art

Home intelligent network is capable of controlling home facilities, such as lighting, heating, ventilation, air conditioning appliances, communication systems, entertainment and home security devices, to improve convenience, comfort, energy efficiency and security.

Home intelligent network may be connected to external networks via a gateway. The gateway may communicate with a service server via a two-way communication server to assist a user in monitoring and controlling facilities of home intelligent network. However, the service server has an upper service limit to how many gateways the service server can serve, and the two-way communication server usually has limited capacity. Accordingly, the service amount of conventional home intelligent network is limited, and its application is not expandable.

For the foregoing reasons, a need has arisen to propose a novel architecture to enhance service and application of home intelligent network.

SUMMARY OF THE INVENTION

In view of the foregoing, it is an object of the embodiment of the present invention to provide an automatic server dispatching system and method for the purpose of automatically dispatching service servers in order to increase service amount and expand application.

According to one embodiment, an automatic server dispatching system includes a two-way communication server, a plurality of gateways, a plurality of service servers and a dispatching server. The service servers communicate with the gateways via the two-way communication server. The dispatching server dispatches the gateways to the service servers according to a dispatching status of the service servers and upper service limits of the service servers.

According to another embodiment, an automatic server dispatching method includes the following steps: a gateway not yet dispatched requests a dispatching server via a two-way communication protocol to dispatch the gateway to one of a plurality of service servers; the dispatching server dispatches the gateway to one of the service servers according to a dispatching status of the service servers and upper service limits of the service servers; the dispatching server updates the dispatching status of the service servers; and the dispatching server notifies the gateway of a corresponding service server via the two-way communication protocol.

DETAILED DESCRIPTION OF THE INVENTION

Figure 1:
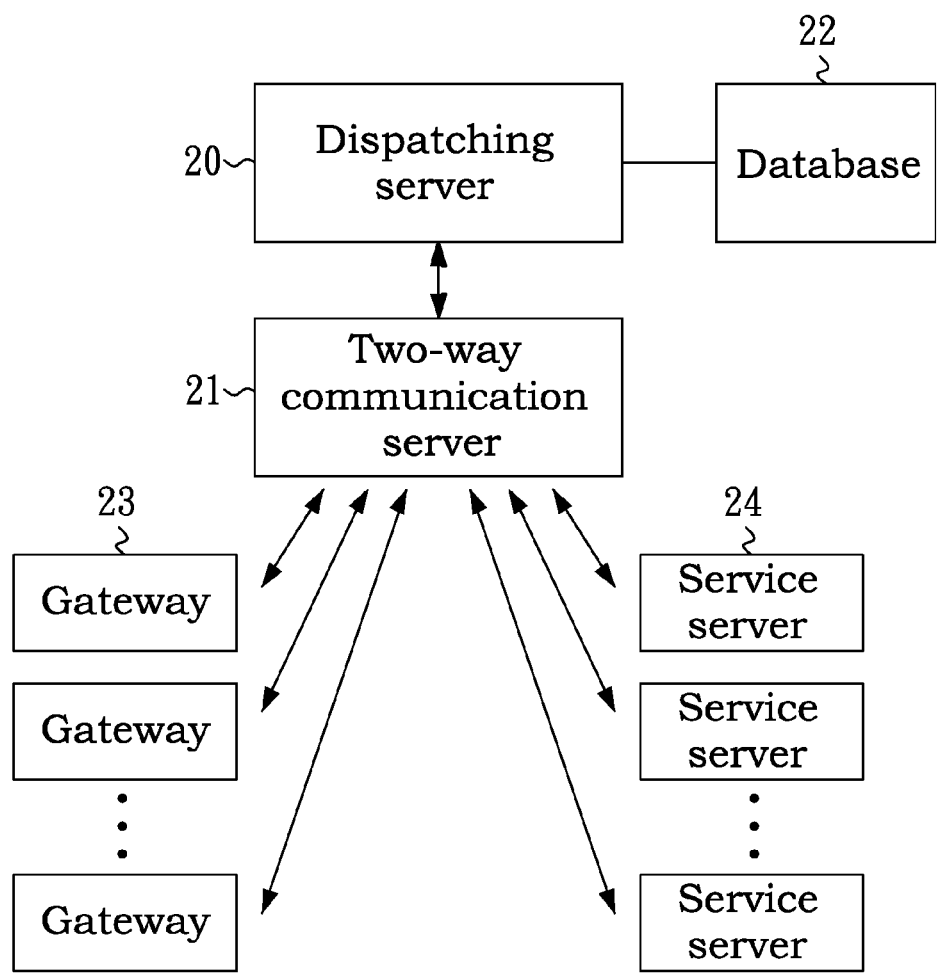
FIG. 1 shows a system block diagram illustrating an automatic server dispatching system according to one embodiment of the present invention.

FIG. 1 shows a system block diagram illustrating an automatic server dispatching system 200 according to one embodiment of the present invention. The automatic server dispatching system (hereinafter dispatching system) 200 may include a two-way communication server 21. In one embodiment, the two-way communication server 21 adopts a message-oriented communication protocol, such as Extensible Messaging and Presence Protocol (XMPP) or Message Queuing Telemetry Transport (MQTT). In one exemplary embodiment, the two-way communication server 21 is, but not necessarily, an XMPP server.

The dispatching system 200 of the embodiment may also include gateways 23 and service servers 24. The gateways 23 may communicate with the service servers 24 via the two-way communication server 21. In the specification, the service servers may be implemented by hardware (e.g., a computer), or implemented by software (e.g., a program).

In one embodiment, each gateway 23 may be connected to object devices in a wired or wireless manner, thereby resulting in Internet of Things (IoT) such as home intelligent network. The object devices mentioned above may include hardware devices (e.g., circuitry or sensor) or software devices (e.g., a program). The network directly connected to the gateway 23 may adopt a variety of wireless network techniques, such as Wi-Fi, Bluetooth, Zigbee and Z-Wave.

According to one aspect of the embodiment, the dispatching system 200 may include a dispatching server 20 primarily configured to dispatch the gateways 23 to the service servers 24, thereby facilitating automatic dispatch of the service servers 24. Specifically, the dispatching server 20 may dispatch the gateway 23 to one of the service servers 24 according to upper service limits of the service servers 24 (i.e., the greatest amount of how many gateways 23 the service server can serve) and a dispatching status of the service servers 24.

The dispatching status of the service servers 24 may be updated whenever necessary. The dispatching status may be recorded in a memory device, for example, of the dispatching server 20, the two-way communication server 21 or other suitable sites. As illustrated in FIG. 1, the dispatching status is recorded in a database 22. Although the database 22 is connected to the dispatching server 20 as exemplified in FIG. 1, it is appreciated that the database 22 may be connected to the two-way communication server 21 instead. In one exemplary embodiment, the database 22 adopts a relational database such as, but not limited to, My Structured Query Language (MySQL) database. After dispatching, the gateways 23 may register at corresponding service servers 24 via the two-way communication server 21. Thereafter, the gateways 23 may communicate with the service server 24 via the two-way communication server 21.

Figure 2:
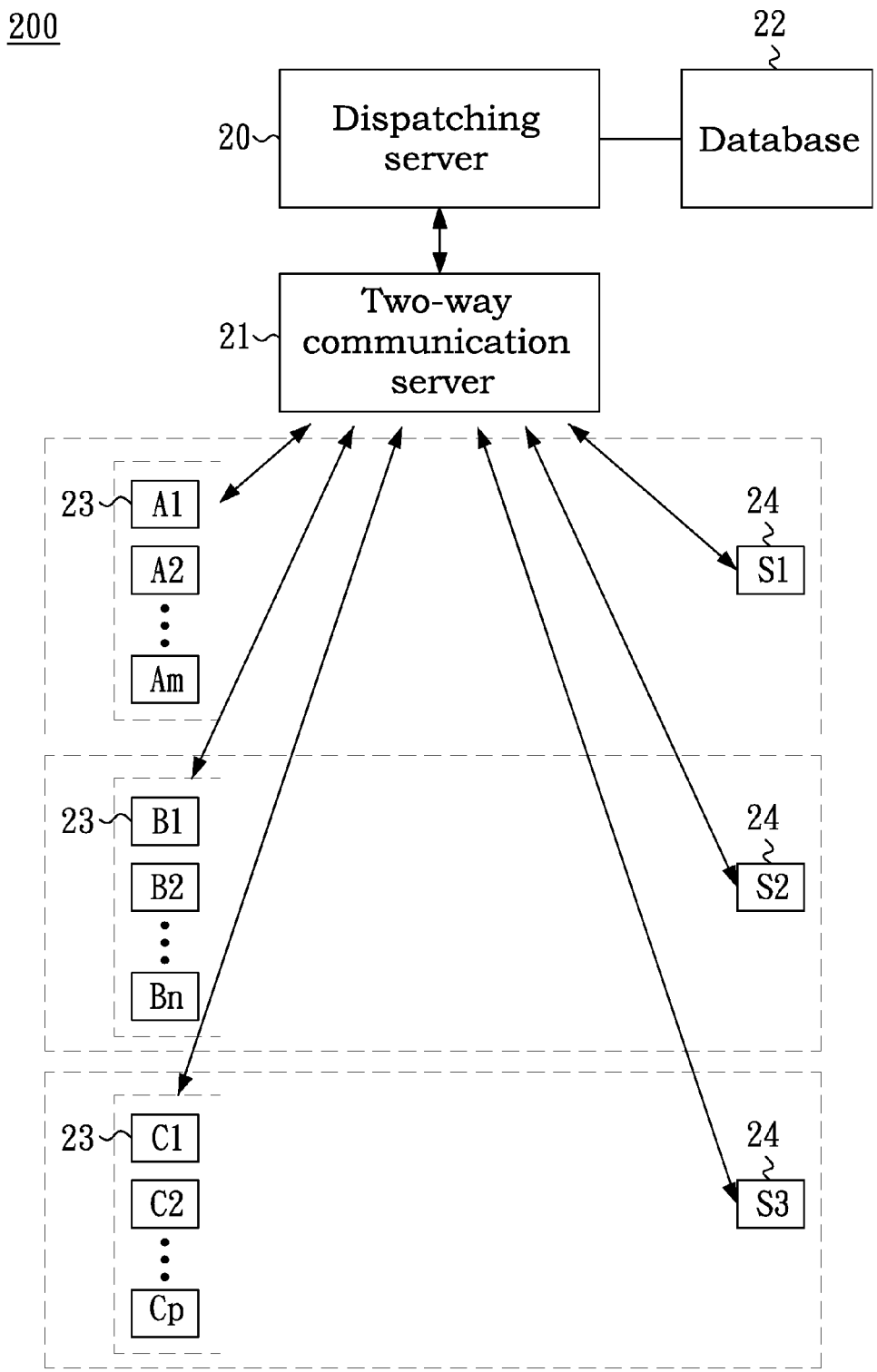
FIG. 2 shows a system block diagram exemplifying the automatic server dispatching system of FIG. 1.

FIG. 2 shows a system block diagram exemplifying the automatic server dispatching system 200 of FIG. 1. In the exemplary embodiment, the dispatching server 20 dispatches gateways A1, A2 . . . Am (23) to a first service server S1 (24), dispatches gateways B1, B2 . . . Bn (23) to a second service server S2 (24), and dispatches gateways C1, C2 . . . Cp (23) to a third service server S3 (24), where m is a value less than an upper service limit of the first service server S1 (24), that is, the greatest amount of how many gateways 23 the first service server S1 can serve; n is a value less than an upper service limit of the second service server S2 (24); and p is a value less than an upper service limit of the third service server S3 (24).

Figure 3A:
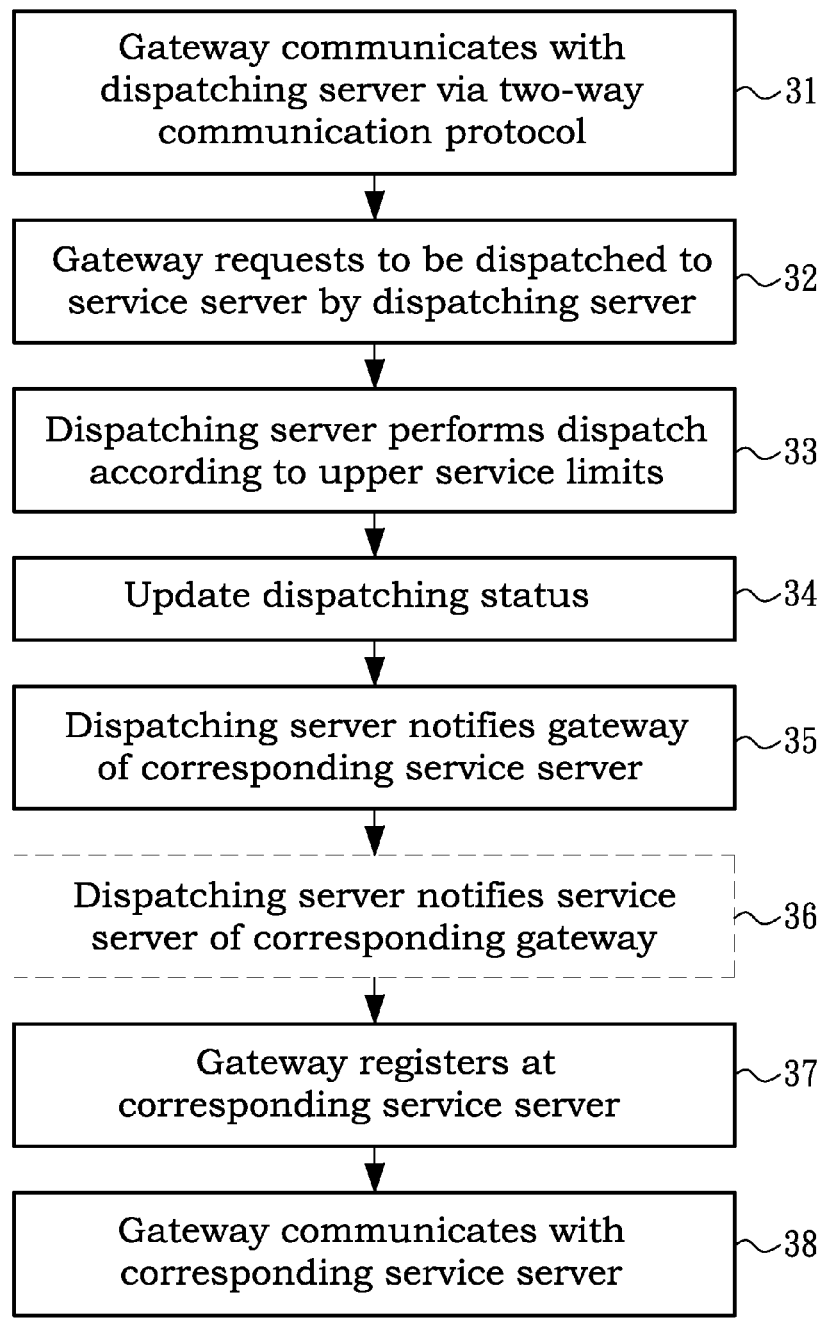
FIG. 3A shows a flow diagram illustrating an automatic server dispatching method according to one embodiment of the present invention.
Figure 3B:
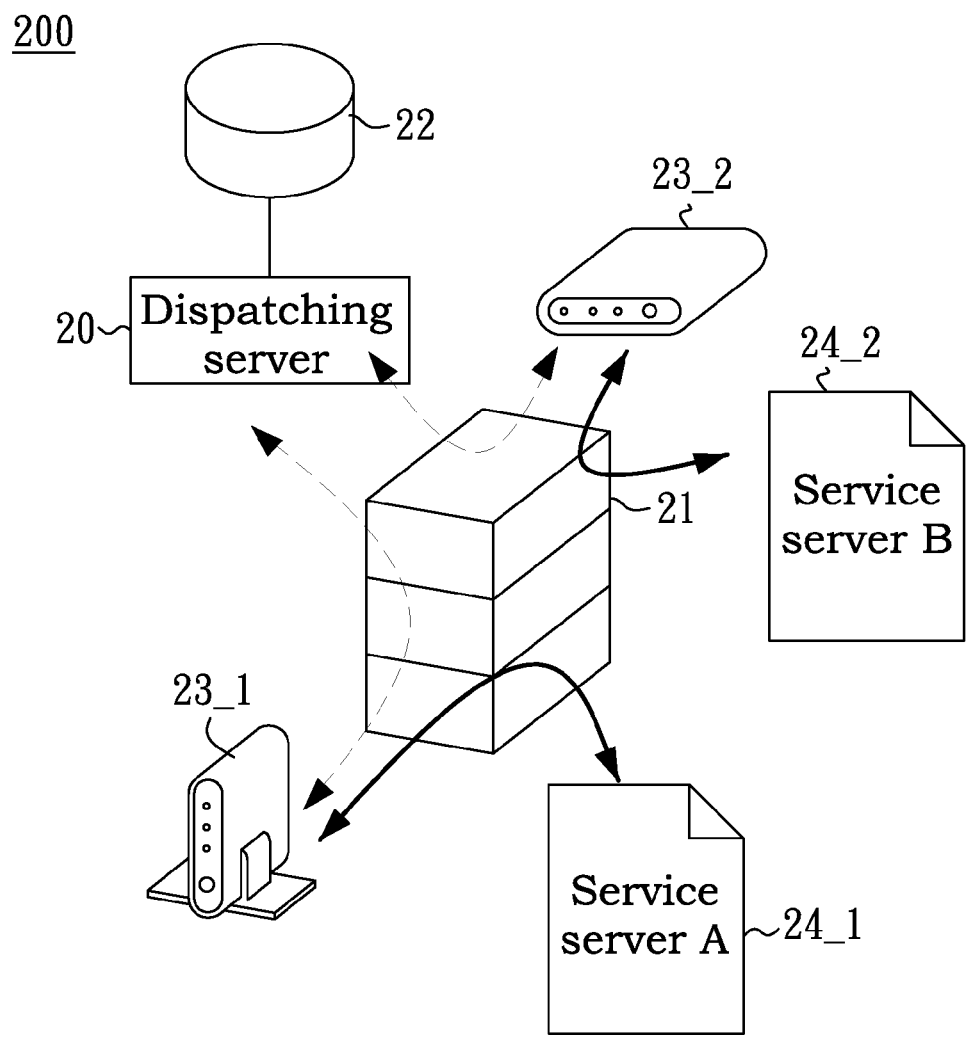
FIG. 3B shows an exemplary system schematic diagram accompanying FIG. 3A.
Figure 3C:
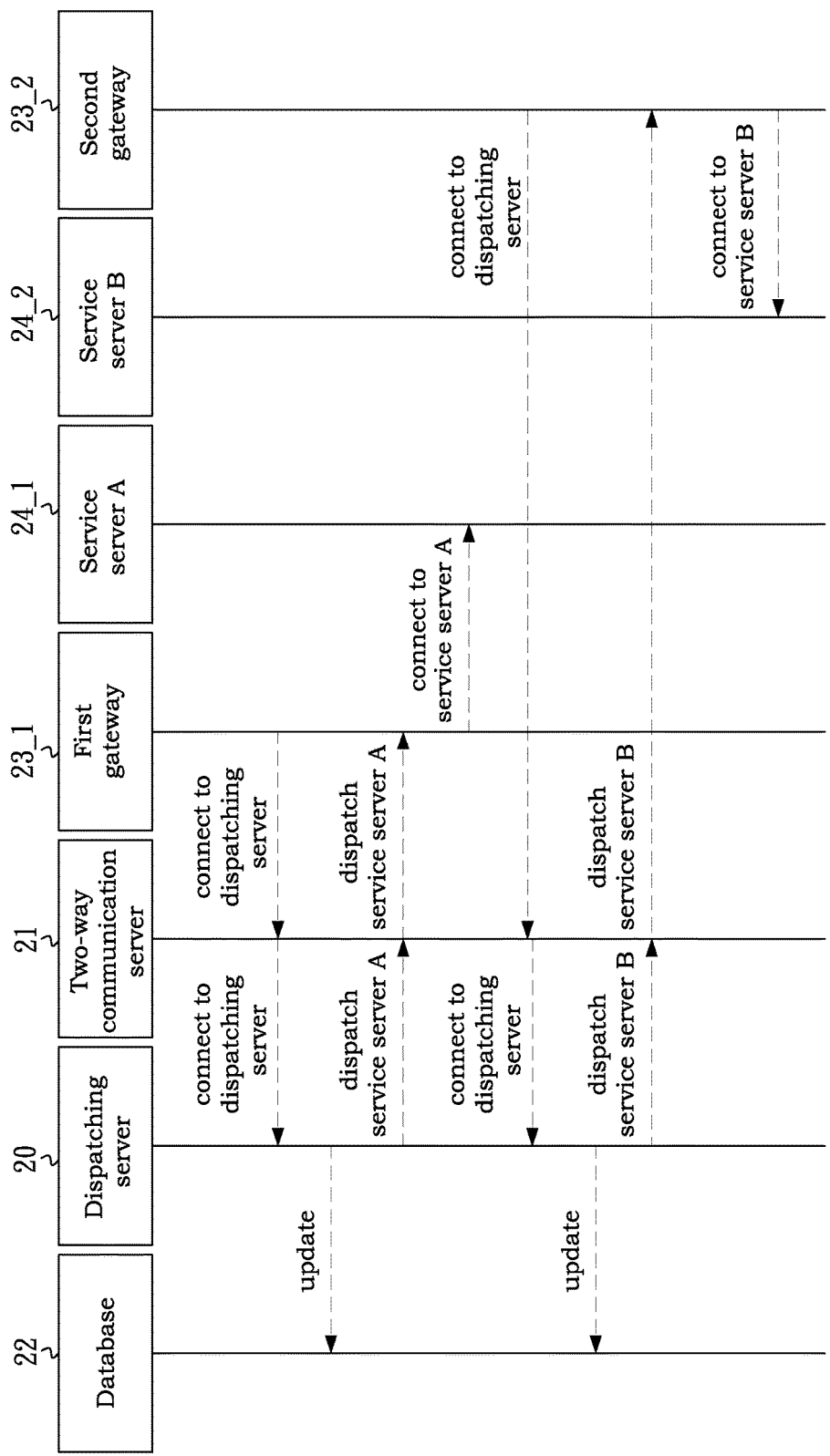
FIG. 3C shows an exemplary message transfer diagram accompanying FIG. 3A.

FIG. 3A shows a flow diagram illustrating an automatic server dispatching method 300 according to one embodiment of the present invention. For better understanding the flow shown in FIG. 3A, please refer to FIG. 3B illustrating a simplified example, and FIG. 3C illustrating a message transfer diagram.

First, in step 31, the gateway 23 may communicate with the dispatching server 20 via a two-way communication protocol. As exemplified in FIG. 3B/3C, the first gateway 23_1 may be connected to and communicate with the dispatching server 20 via the two-way communication protocol (e.g., XMPP or MQTT) of the two-way communication server 21.

In step 32, a not-yet-dispatched gateway 23 may request the dispatching server 20 to dispatch the gateway 23 to one of the service servers 24. In the specification, not-yet-dispatched gateways 23 may broadly refer to gateways needed be dispatched once again. Subsequently, in step 33, the dispatching server 20 may dispatch the gateway 23 to one of the service servers 24 according to upper service limits of the service servers 24 and a dispatching status of the service servers 24. As exemplified in FIG. 3B/3C, the dispatching server 20 determines that the amount of the gateways 23 that the service server A (24_1) can serve has not reached the upper service limit. Accordingly, the dispatching server 20 thus dispatches the first gateway 23_1 to the service server A (24_1).

In step 34, the dispatching server 20 may update a dispatching status after completing step 33. In step 35, the dispatching server 20 may notify the gateway 23 of a corresponding dispatched service server 24 via the two-way communication protocol. As exemplified in FIG. 3B/3C, the dispatching server 20 notifies the first gateway 23_1 of a corresponding dispatched service server A (24_1).

In optional step 36, the dispatching server 20 may notify the service server 24 of a corresponding gateway 23 via the two-way communication protocol. For example, the dispatching server 20 notifies the service server A (24_1) of the corresponding first gateway 23_1 via the two-way communication protocol of the two-way communication server 21. Steps 34, 35 and 36 discussed above may be performed in an order other than that shown in FIG. 3A.

Afterwards, in step 37, the gateway 23 may register at the corresponding service server 24 via the two-way communication protocol. Accordingly, in step 38, the gateway 23 may communicate with the corresponding service server 24 via the two-way communication protocol. As exemplified in FIG. 3B/3C, the first gateway 23_1 registers at the service server A (24_1) via the two-way communication protocol of the two-way communication server 21. Accordingly, the first gateway 23_1 communicates with the service server A (24_1) via the two-way communication protocol of the two-way communication server 21.

As exemplified above, the first gateway 23_1 is dispatched to the service server A (24_1). The second gateway 23_2 as shown in FIG. 3B/3C may be dispatched to the service server B (24_2) in a similar manner.

Figure 4A:
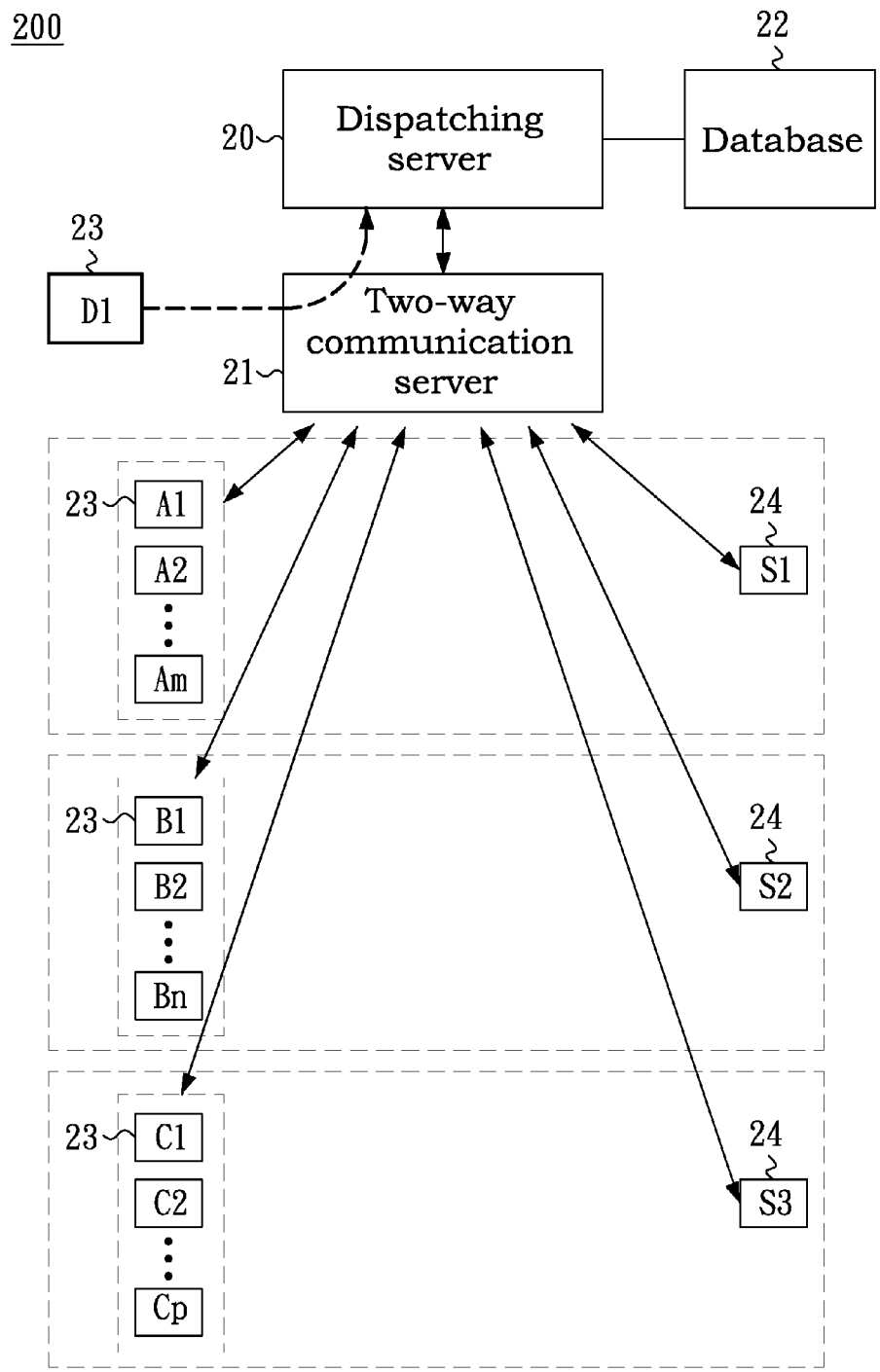
FIG. 4A to FIG. 4C show system block diagrams exemplifying the automatic server dispatching system.
Figure 4B:
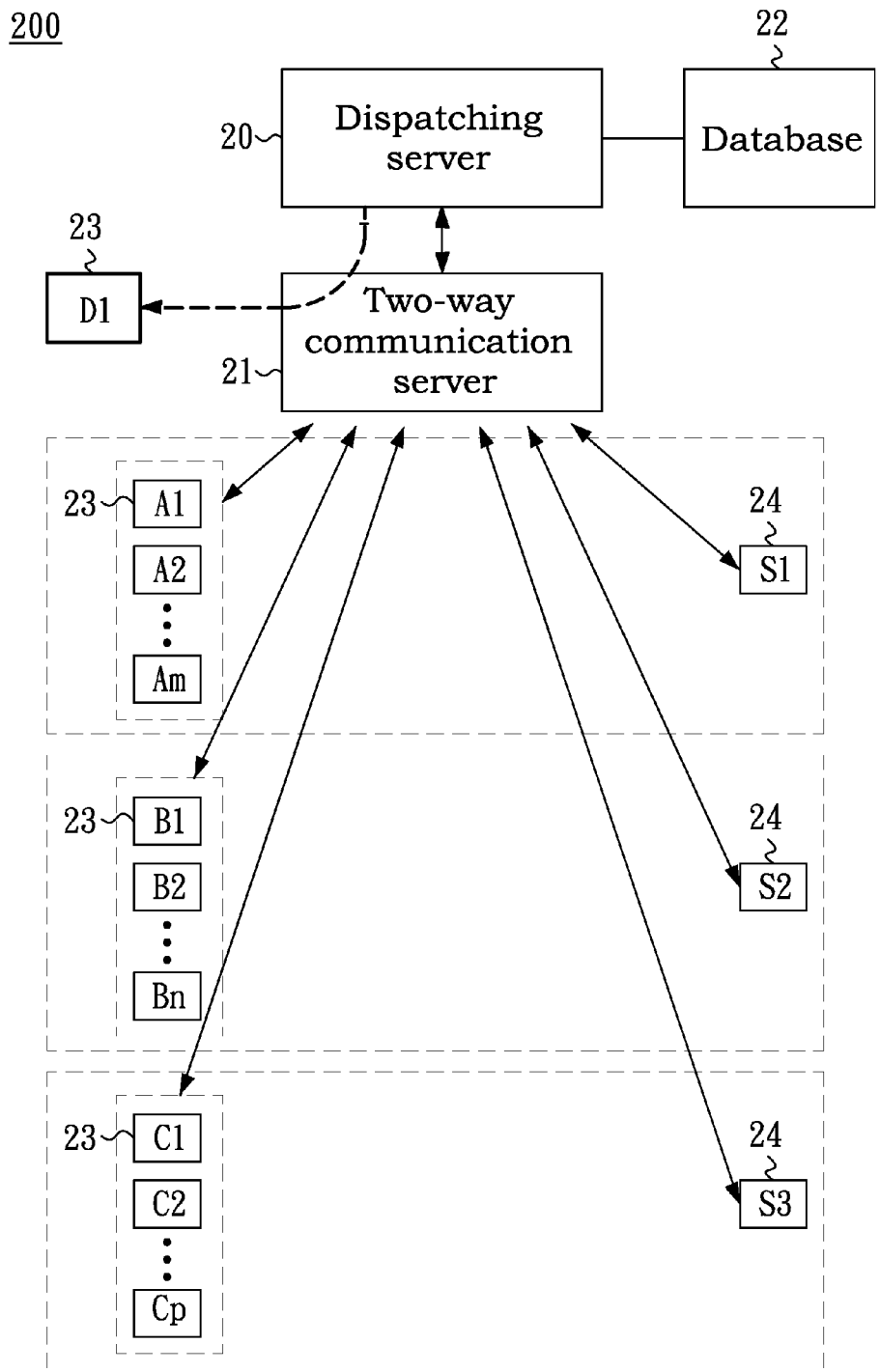
Figure 4C:
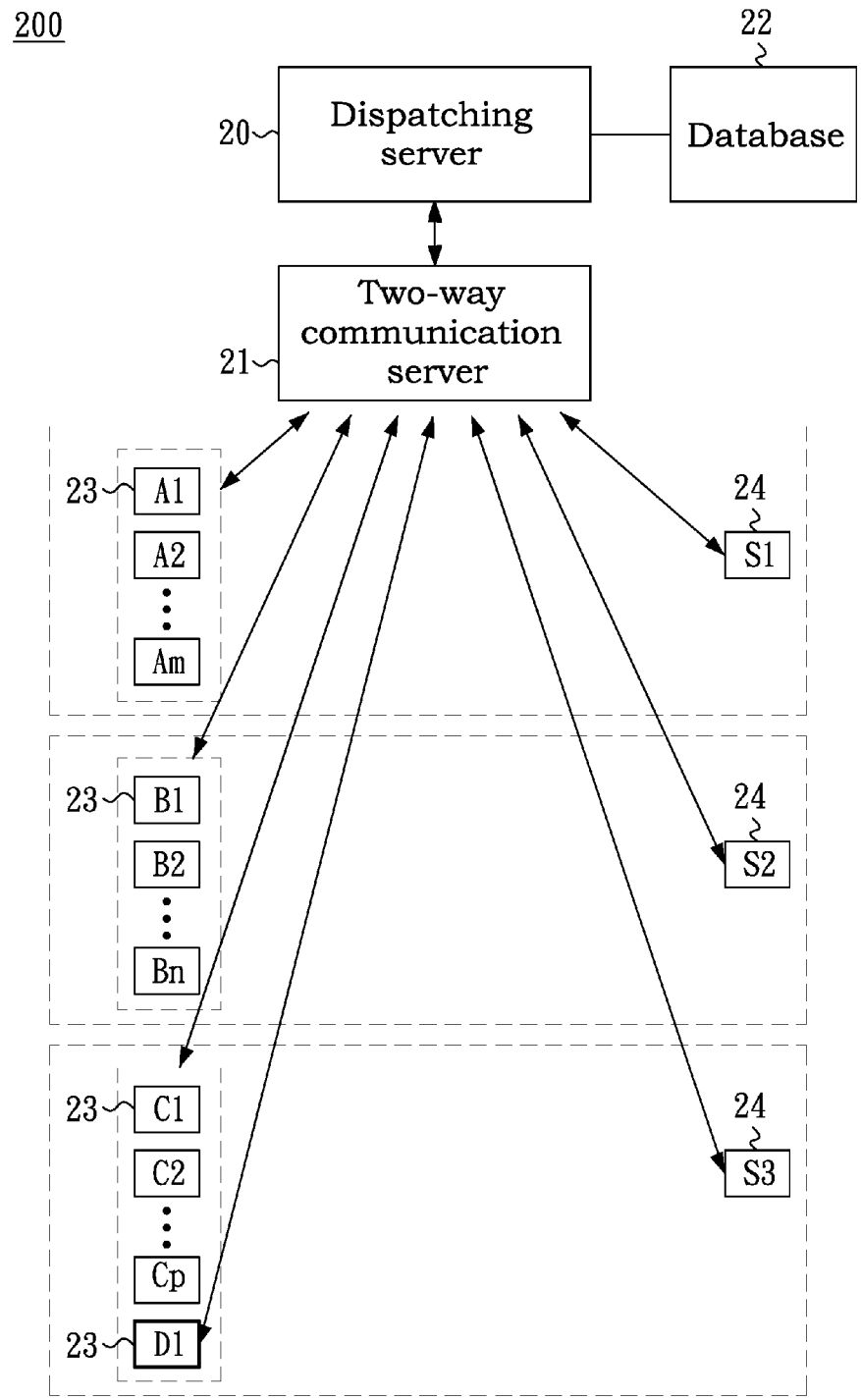

FIG. 4A to FIG. 4C follow FIG. 2 to demonstrate that a gateway D1 (23) joins the automatic server dispatching system 200. First, as shown in FIG. 4A, the gateway D1 (23) communicates with the dispatching server 20 via the two-way communication server 21 (step 31), and requests the dispatching server 20 to dispatch the gateway D1 (23) to one of the service servers 24 (step 32). The dispatching server 20 determines that the amount of the gateways C1, C2 . . . Cp (23) has not reached the upper service limit of the third service server S3 (24). Accordingly, the gateway D1 (23) is thus dispatched to the third service server S3 (24) (step 33). As shown in FIG. 4B, the dispatching server 20 notifies the gateway D1 (23) that the gateway D1 (23) has been dispatched to the third service server S3 (24) (step 35). FIG. 4C shows a system block diagram illustrating the automatic server dispatching system 200 after dispatch. Accordingly, the gateway D1 (23) registers at the third service server S3 (24) via the two-way communication server 21 (step 37), and, thereafter, the gateway D1 (23) communicates with the third service server S3 (24) via the two-way communication server 21 (step 38).

Figure 5:
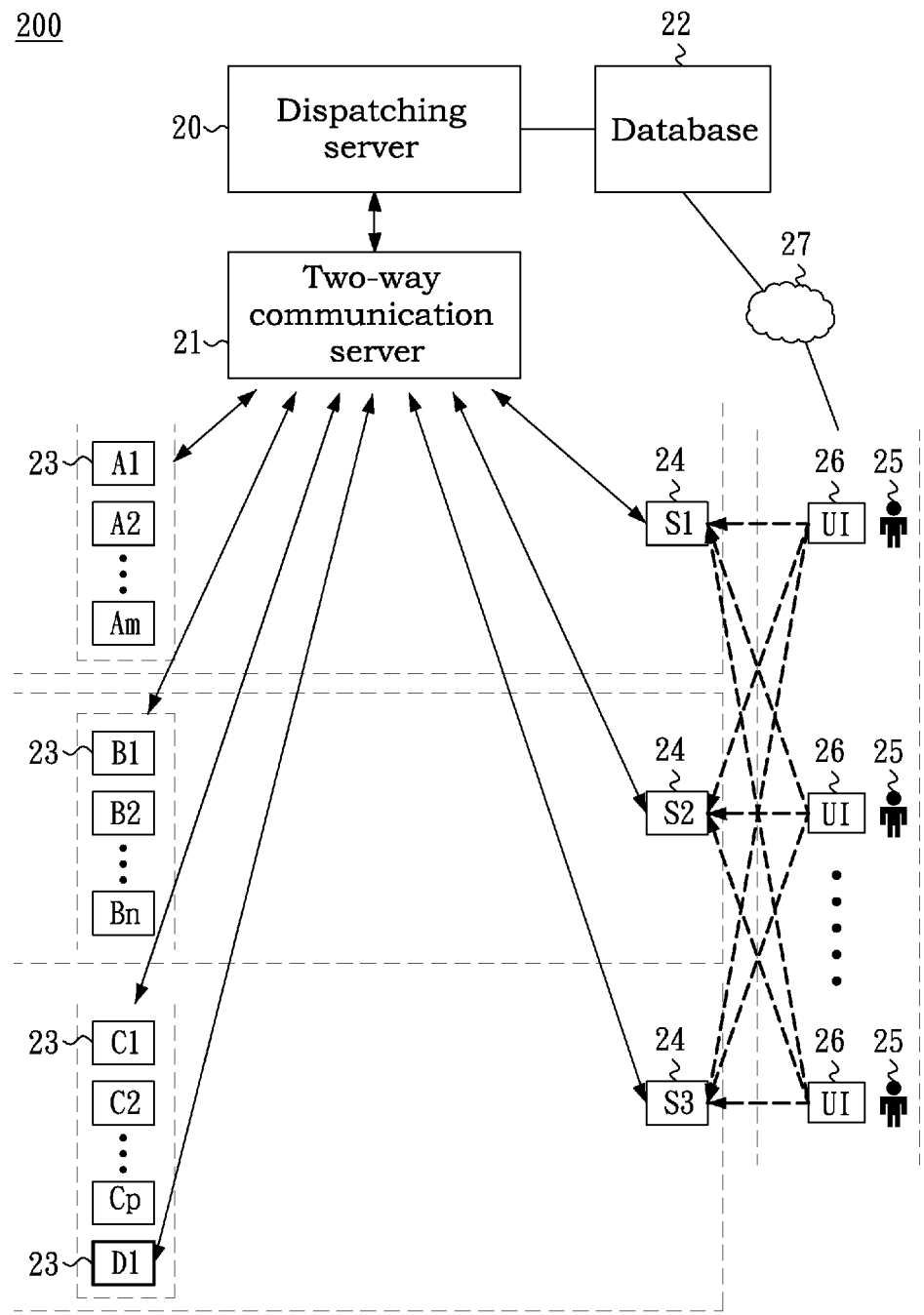
FIG. 5 shows a system block diagram exemplifying the automatic server dispatching system.

FIG. 5 follows FIG. 4C to demonstrate that, after the dispatch and register of the gateway 23, a user 25 may control object devices (not shown) connected with the corresponding gateway 23. Specifically, first, the user 25 may obtain dispatching status of the gateway 23 from the database 22 via an associated user interface (UI) 26. As a result, the user 25 may recognize the service server 24 corresponding to the gateway 23 to be controlled. As exemplified in FIG. 5, the dispatching status of the gateway 23 may be obtained by the user interface 26 from the database 22 via a network (e.g., the Internet) 27. After recognizing the corresponding service server 24 by the user interface 26, the service server 24 may communicate with the corresponding gateway 23 via the two-way communication server 21. Accordingly, the user 25 may control the object devices connected with the corresponding gateway 23.

Although specific embodiments have been illustrated and described, it will be appreciated by those skilled in the art that various modifications may be made without departing from the scope of the present invention, which is intended to be limited solely by the appended claims.

What is claimed is:

1. An automatic server dispatching system, comprising:
    a two-way communication server;
    a plurality of gateways;
    a plurality of service servers communicated with the plurality of gateways via the two-way communication server; and
    a dispatching server allocating the gateways to the service servers according to a dispatching status of the service servers and upper service limits of the service servers.

2. The system of claim 1, wherein the two-way communication server adopts a message-oriented communication protocol.

3. The system of claim 2, wherein the message-oriented communication protocol comprises Extensible Messaging and Presence Protocol (XMPP) or Message Queuing Telemetry Transport (MQTT).

4. The system of claim 1, further comprising a database that records the dispatching status of the service servers.

5. The system of claim 4, wherein the database comprises a relational database.

6. The system of claim 1, after allocating the gateways, the gateways register at corresponding service servers via the two-way communication server, and the gateways then communicate with the corresponding service servers via the two-way communication server.

7. The system of claim 1, wherein the gateways each connects with a plurality of object devices to result in Internet of Things (IoT).

8. The system of claim 7, further comprising:
at least one user interface connected to obtain the dispatching status;
wherein the user interface recognizes a service server corresponding to a gateway to be controlled according to the dispatching status, and the recognized service server then communicates with the corresponding gateway via the two-way communication server, thereby a user controlling the object devices connected with the corresponding gateway.

9. An automatic server dispatching method, comprising:
a gateway not yet dispatched requesting a dispatching server via a two-way communication protocol to allocate the gateway to one of a plurality of service servers;
the dispatching server allocating the gateway to one of the service servers according to a dispatching status of the service servers and upper service limits of the service servers;
the dispatching server updating the dispatching status of the service servers; and
the dispatching server notifying the gateway of a corresponding service server via the two-way communication protocol.

10. The method of claim 9, wherein the two-way communication protocol comprises a message-oriented communication protocol.

11. The method of claim 10, wherein the message-oriented communication protocol comprises Extensible Messaging and Presence Protocol (XMPP) or Message Queuing Telemetry Transport (MQTT).

12. The method of claim 9, wherein the dispatching status of the service servers is updated in a database.

13. The method of claim 12, wherein the database comprises a relational database.

14. The method of claim 9, further comprising:
the dispatching server notifying the corresponding service server of the gateway to be allocated.

15. The method of claim 9, further comprising:
the gateway registering at the corresponding service server via the two-way communication protocol.

16. The method of claim 15, further comprising:
after register, the gateway communicating with the corresponding service server via the two-way communication server.

17. The method of claim 9, wherein the gateway connects with a plurality of object devices to result in Internet of Things (IoT).

18. The method of claim 17, further comprising:
connecting at least one user interface to obtain the dispatching status;
wherein the user interface recognizes a service server corresponding to a gateway to be controlled according to the dispatching status, and the recognized service server then communicates with the corresponding gateway via the two-way communication protocol, thereby a user controlling the object devices connected with the corresponding gateway.

* * * * *